US008241445B2

(12) United States Patent
LaFevre et al.

(10) Patent No.: US 8,241,445 B2
(45) Date of Patent: Aug. 14, 2012

(54) FLASHING MATERIAL

(75) Inventors: Richard LaFevre, Warwick, RI (US); Chander Patil, Burlington, MA (US)

(73) Assignee: Dryvit Systems, Inc., W. Warwick, RI (US)

( * ) Notice: Subject to any disclaimer, the term of this patent is extended or adjusted under 35 U.S.C. 154(b) by 1053 days.

(21) Appl. No.: 11/103,788

(22) Filed: Apr. 12, 2005

(65) Prior Publication Data

US 2006/0225836 A1 Oct. 12, 2006

(51) Int. Cl.
*B32B 37/15* (2006.01)

(52) U.S. Cl. ............................... 156/71; 52/416; 52/417

(58) Field of Classification Search .................... 156/71; 52/415, 416, 417
See application file for complete search history.

(56) References Cited

U.S. PATENT DOCUMENTS

| | | | | |
|---|---|---|---|---|
| 4,054,483 | A * | 10/1977 | Peiffer | 430/315 |
| 4,197,338 | A * | 4/1980 | Perna | 427/278 |
| 4,820,754 | A * | 4/1989 | Negri et al. | 524/44 |
| 5,494,947 | A * | 2/1996 | Kaplan | 523/122 |
| 5,584,154 | A | 12/1996 | Koepke et al. | |
| 6,088,986 | A * | 7/2000 | DiGate | 52/514 |
| 6,725,610 | B2 | 4/2004 | Murphy et al. | |
| 2001/0034984 | A1* | 11/2001 | Murphy et al. | 52/204.5 |
| 2003/0177736 | A1 | 9/2003 | Gatherum | |
| 2003/0181114 | A1* | 9/2003 | Newton et al. | 442/149 |
| 2004/0060480 | A1* | 4/2004 | Ayambem | 106/793 |

* cited by examiner

*Primary Examiner* — Mark A Osele
(74) *Attorney, Agent, or Firm* — Fay Sharpe LLP

(57) ABSTRACT

A method of sealing a construction joint is provided which comprises applying a polymeric sizing to the edges forming the joint, applying a mesh to the joint and applying a further coating of the sizing to said deposited mesh. The sizing material can comprise a styrene-butadiene latex, a filler and at least one of a colorant, an acrylic thickener, dispersant, biocide, defoamer, antifoamer, surfactant and an acid.

7 Claims, 1 Drawing Sheet

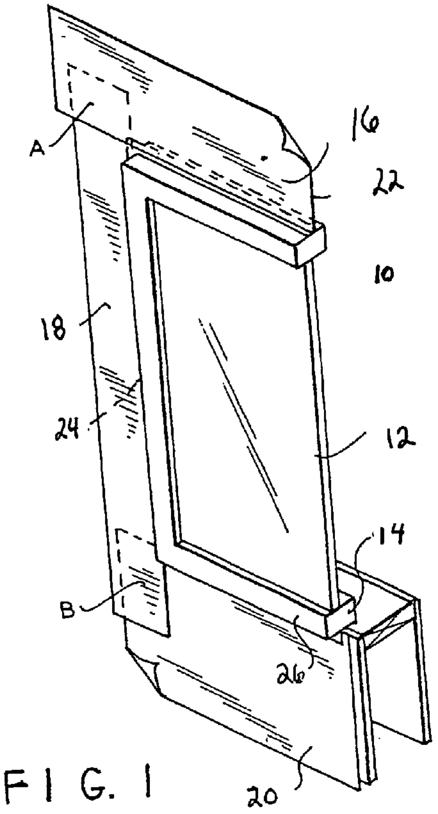
FIG. 1
PRIOR ART
Fig. 2
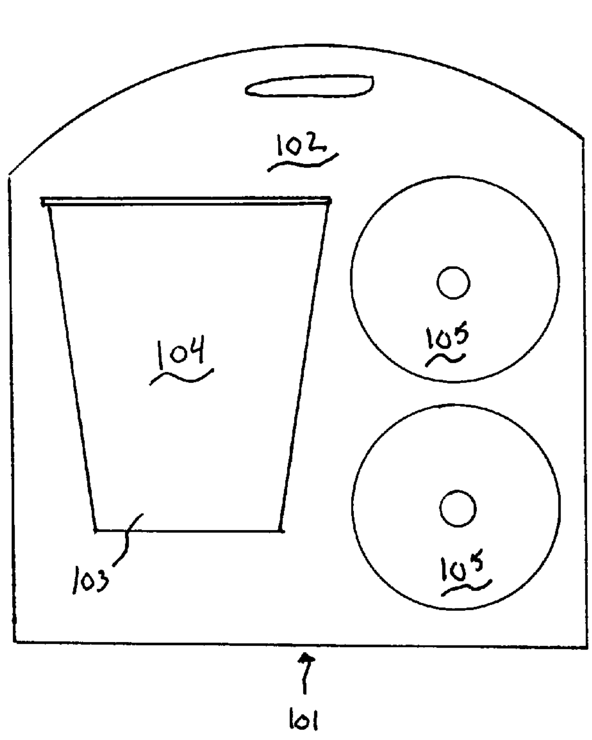
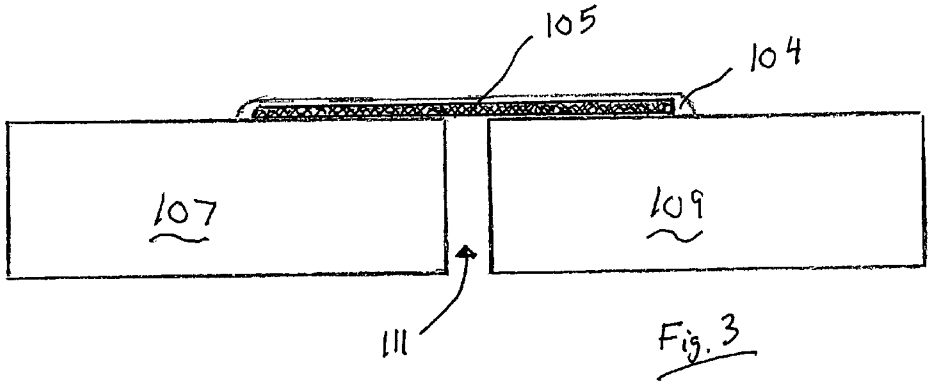
Fig. 3

FLASHING MATERIAL

The present invention relates generally to a system for sealing construction joints. More particularly, the system relates to sealing joints around, for example, windows and doors during the construction of a structure and comprises the components of the system and a method for sealing joints using the system.

Exterior closures, such as doors and windows, must generally provide a barrier between the outside and the inside of the structure in which they are used. Accordingly, rough openings in exterior walls are often sealed using sheet products in the form of felt, fiber reinforced felt papers, house wrap products, and polyethylene backed self-adhering membranes. This is intended to prevent water which may enter from inadvertent leakage, from coming into direct contact with moisture sensitive materials such as framing and sheathing.

Moreover, it has been found that joints within component elements can provide leakage paths. Even where these joints are tightly glued and otherwise tightly affixed, circuitous leak paths may exist between the component elements that permit air or moisture to penetrate through the frame of the component. The potential for entry of air and moisture is greatly exacerbated by the use of nails, screws, or staples to secure the component elements.

In FIG. 1, a typical nail-on window frame assembly 6 is shown. The assembly 10 includes a glass pane 12 set in a frame 14. Flashing materials 16, 18 and 20 overlap the nailing flanges on the respective head 22, jamb 24 sides of the frame 14 and under the sill flange 26. The flashing materials 16, 18 and 20 are typically of polymeric material or the like of low permeance, exhibiting negligible moisture vapour penetration. The flashing materials 16, 18 and 20 are applied sequentially as sealing strips resulting in overlap at regions A, B and so on at each of the corners. An exemplary sealing strip comprises a polymeric sheet which is usually stapled to the sheathing. The stapling can provide minor leakage paths. Necessarily, the sealing strips are applied in a sequence resulting in lapping wherein an upper layer is applied over a lower layer to properly shed water.

One example of an adhesive sealing strip is the Dryvit Flashing Tape, a tough, self-adhering construction grade tape used to seal rough openings in walls by bridging the joints between sheathing and other underlying framing or foundation components. Dryvit Flashing Tape is a cold-applied, self-adhering membrane composed of a high density, cross laminated polyethylene film coated on one side with a layer of rubberized asphalt adhesive.

Subsequent to joint sealing, an exterior treatment (e.g. EIFS, wood siding, stucco, brick, etc.) is applied. Unfortunately, self-adhering membranes, such as those of either a rubberized asphalt or butyl adhesive backed polyethylene sheet exhibit poor adhesion on selected substrates in selected conditions. Therefore, depending on when the cladding crew can be scheduled and how long it takes to prepare and apply the particular exterior system used, the sealing strips may become "unstuck", or they can wrinkle, and otherwise can provide a less than perfect seal.

SUMMARY OF THE INVENTION

According to one embodiment a method of sealing a construction joint is provided, wherein a liquid latex polymeric sizing compound is applied to the building components forming the joint, a mesh is at least partially embedded in the sizing before drying thereof and further sizing is deposited on the mesh. Optionally, subsequent to drying of the at least partially embedded tape, a further top coat of sizing can be applied.

According to another embodiment, a sizing material for securing a weather resistant mesh to a construction joint is provided. The sizing composition comprises a waterborne styrene-butadiene polymer, a filler and at least one of a colorant, an acrylic thickener, dispersant, biocide, defoamer, preservative, surfactant and an acid.

According to a further embodiment, a kit for sealing construction joints is provided which includes the above sizing composition and tape. Optionally, the kit can also contain at least one of a sizing applicator, and/or a tape applicator.

BRIEF DESCRIPTION OF THE DRAWINGS

FIG. 1 is a schematic depiction of a prior art window installation.

FIG. 2 is a schematic depiction of the flashing kit of the present invention.

FIG. 3 is a cross-sectional view of the present flashing affixed to a construction joint.

DETAILED DESCRIPTION OF THE INVENTION

Referring now to FIG. 2, the present invention comprises a kit 101 having a housing 102 including a bucket 103 containing a sizing composition 104 and two mesh 105 rolls. The housing can be comprised of any typical packaging materials including polymeric or paper products. The sizing comprises a waterproof, water-based polymer material used in conjunction with the mesh to seal joints around window, door and other openings. The invention provides an effective water and weather resistive membrane for covering joints around window, door and other structures.

Referring now to FIG. 3, the present seal is illustrated as affixed to structural elements 107 and 109. The mesh 105, which is embedded in sizing 103 forms an effective seal over gap 111. The mesh 105 is preferably porous such that it can sufficiently embed and absorb sizing 104. A preferred mesh is comprised of a porous non-woven closed weave material. However, the skilled artisan will recognize that an open weave material will also function effectively. Polyester is one example of a compound suited to forming the tape. The tape can be in rolls of varying widths, such as 102 mm (4"), 152 mm (6"), 229 mm (9"), and of a practical length such as 54.9 m (180 ft). The mesh can also be supplied in sheet form. The present invention can bridge substrate gaps up to (19.0 mm) ¾ inch, but is most effective on gaps of 6.4 mm (¼ in).

The sizing composition can be comprised of any suitable material. One preferable material is comprised of a waterborne styrene-butadiene polymer having a specific gravity between 1.00 and 1.70 and a viscosity of about 50-140 paste units, preferably between bout 80-140 paste units. The sizing can be comprised, for example, of between 15 and 45% polymer, 5-45% calcium carbonate, 20-50% water and optionally up to 30% by weight encapsulated sand. A typical pH for this composition is between 8.0 and 9.9. Desirable characteristics of the latex include adhesion to various common substrates normally encountered in construction including, gypsum, wood, metal, aluminium, etc. The sizing is a non-cementitious material, providing working time similar to paint. The product will not set up in the bucket. Since the present invention is applied as a liquid, it can be applied above or below the water resistant barrier for the wall face. Therefore, it can be applied either before or after the wall face application. Because the present invention forms a cohesive joint between overlapping sheets, sequencing of tape application is not required. The present invention is not generally sensitive to minor surface discontinuities or moisture and can be used at temperatures as low as 40° F. The present invention can be exposed to the elements for up to six months. The present invention can be applied without the use of nails or staples or other fasteners. Typical EIFS adhesives bond extremely well to the present invention.

When applied to recommended substrates, the present invention is substantially waterproof, flexible and can be exposed to weather for up to 6 months prior to covering with an approved exterior system. Recommended substrates include but not limited to:

Paper faced gypsum sheathing
Fiber glass faced gypsum sheathing
cement boards
Plywood
Metal (free of grease) or wood studs
Concrete The kit forming the invention can include a pail of sizing and at least one mesh roll. Optionally, the kit may also contain a tape, a sizing, an applicator and/or trimming tool such as scissors, shears or a knife. The sizing applicator will generally comprise a brush or roller mechanism. The tape applicator can comprise any device suitable for smoothing such as a flat edge trowel. Alternatively, the brush or roller used for sizing application may also be used for mesh application. The drying time of the present invention is dependent upon the air temperature, wind conditions and relative humidity. Under average drying conditions (21° C. (70° F.), 55% R.H., the present invention will set within 30 minutes on an absorbent substrate, and 1.5 hours on a non-absorbent substrate.

The general methodology for using the subject invention includes applying a surface coat of the sizing using a brush or roller to the surface of the construction elements defining the joint. Before setting, a mesh is embedded into the wet surface, and a coating of the sizing applied over the embedded mesh. Thereafter, the mesh/sizing combination is smoothed out (with a trowel or brush or nap roller) to ensure a uniform, continuous film free of voids, pinholes or other discontinuities. After setting (e.g. 25-30 minutes), a top coat of sizing can be applied to the set mesh.

One exemplary embodiment has been described. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of sealing a construction joint comprising applying a liquid polymeric sizing comprised of between 15 and 45 percent by weight waterborne styrene-butadiene polymer to the substrate forming the joint at least partially embedding a mesh into said sizing, and applying an upper coating of said sizing to said embedded mesh, wherein said styrene butadiene polymer has a specific gravity between about 1.00 and 1.70.

2. The method of claim 1 further comprising applying a top coat of said sizing over said upper coating.

3. The method of claim 2 wherein at least one subsequent layer of sizing is applied over said top coat.

4. The method of claim 1 wherein said sizing is applied by a brush or roller.

5. The method of claim 1, wherein said sizing has a viscosity between about 50 and 140 paste units.

6. The method of claim 1 wherein said mesh is comprised of a closed weave material.

7. The method of claim 1 wherein said mesh comprises a non-woven polyester.

* * * * *

UNITED STATES PATENT AND TRADEMARK OFFICE

CERTIFICATE OF CORRECTION

PATENT NO. : 8,241,445 B2
APPLICATION NO. : 11/103788
DATED : August 14, 2012
INVENTOR(S) : Richard LeFevre and Chander Patil It is certified that error appears in the above-identified patent and that said Letters Patent is hereby corrected as shown below:

Title Page, Items (12) and (75): change Inventor's name from LaFevre to LeFevre.

Column 4, line 19 delete "and".

Column 14, line 20, after "embedded mesh" add "and smoothing said mesh by a brush or roller after applying said upper coat".

Signed and Sealed this
Second Day of October, 2012

David J. Kappos
*Director of the United States Patent and Trademark Office*